United States Patent

Lee

Patent Number: 5,435,591
Date of Patent: Jul. 25, 1995

[54] STEERABLE FRONT WHEEL SUSPENSION FOR VEHICLE

[75] Inventor: Unkoo Lee, Kyungki, Rep. of Korea

[73] Assignee: Hyundai Motor Co., Seoul, Rep. of Korea

[21] Appl. No.: 174,020

[22] Filed: Dec. 28, 1993

[30] Foreign Application Priority Data

Dec. 28, 1992 [KR] Rep. of Korea .................. 92-25853

[51] Int. Cl.6 .............................................. B60G 3/18
[52] U.S. Cl. ...................................... 280/673; 280/691
[58] Field of Search .................. 280/691, 95.1, 660, 280/673, 675, 692, 693, 696, 697, 698, 701

[56] References Cited

U.S. PATENT DOCUMENTS

| | | | |
|---|---|---|---|
| 4,871,187 | 10/1989 | Schaible | 280/696 |
| 5,238,261 | 8/1993 | Ogiso | 280/691 |
| 5,348,337 | 9/1994 | Ando | 280/691 |

FOREIGN PATENT DOCUMENTS 3193513  8/1991  Japan ................................ 280/675

Primary Examiner—Margaret A. Focarino
Assistant Examiner—Paul N. Dickson
Attorney, Agent, or Firm—Birch, Stewart, Kolasch & Birch

[57] ABSTRACT

A steerable front wheel suspension for vehicle includes a knuckle, an upper control arm, a lower control arm connecting the knuckle to a vehicle body, a strut assembly, a connecting arm, a control link, and a connecting member connecting the connecting arm and the control link, fixed to the strut assembly, wherein a plurality of links are connected so that an instantaneous center of the wheel with respect to the vehicle body is defined by an intersection point of a first nominal line formed by connecting an intersection point of a nominal line connecting hinge points of both ends of the upper control arm and a nominal line connecting hinge points of both ends of the connecting member to an instantaneous center of a wheel with respect to the connecting arm, and a second nominal line formed by connecting hinge points of both ends of the lower control arm. Therefore, it is possible to increase a free layout degree with respect to a camber and caster, to improve handling stability by providing a nominal kingpin and decreasing variation of a height of a roll-center by a nominal link and to maximize the effective volume of engine room by minimizing the space which the suspension system occupies.

7 Claims, 5 Drawing Sheets

STEERABLE FRONT WHEEL SUSPENSION FOR VEHICLE

BACKGROUND OF THE INVENTION

1. Field of the Invention

The present invention relates to a steerable front wheel suspension for a vehicle and, more particularly, to a front wheel suspension for a vehicle which can increase a free layout degree with respect to a variation of a camber and caster, improve handling stability by providing a nominal kingpin and decreasing variation of a height of roll-center by means of a nominal link, and maximize the effective volume of an engine room by minimizing the space which the suspension system occupies.

2. Description of Related Art

In general, a suspension for a vehicle connects an axle shaft and a vehicle body to each other and controls a position of a wheel with respect to the vehicle body to obtain a better positioning in a vehicle operation. The axle shaft is thereby prevented from directly transmitting an impact or vibration from a road surface to the vehicle body, so that there can be obtained an optimal handling stability, a reduction in damage to baggage, and an improved ride comfort.

The suspension system is divided structurally into integral shaft suspension and independent suspension. The present invention relates to the independent suspension which can be divided into one of a McPherson strut type and a Wishbone type suspension system for a steering wheel.

Particularly, in a steerable front wheel suspension, the suspension should be designed to absorb vibration or impact from the road surface as well as obtain running stability by maintaining an optimal position of a vehicle's straight ahead position and handling stability of a vehicle's turning position.

The front wheel is mounted to change its direction from right to left or from left to right, while centering the kingpin, and is also mounted with a geometric angle so as to meet the requisite for the front suspension.

Mounting the front wheel with the geometric angle is called a front wheel alignment. The front wheel alignment is distinguished by several elements, but the optimal operation of the front wheel is, however, achieved by the supplemental operation of the elements with respect to each other. A kingpin inclination among the elements reduces a handling force of a steering wheel with a camber, absorbs an impact generated when the vehicle is running and being braked, and then increases restitution force of a steering wheel, thereby obtaining running stability in the vehicle's straight ahead position and handling stability in the vehicle's turning position.

The kingpin is mounted at an inclination such that its central line lies at a predetermined angle with respect to the vertical line when the vehicle is viewed from the front. An interval between the center line of the kingpin and a center line of the wheel is called offset. The offset is generally characterized as an offset at the wheel center and an offset at the ground. The offset at the wheel center has an effect on the vehicle's straight ahead running characteristics when either the driving force or the engine brake is applied to the wheels. The offset at the ground has an effect on the handling stability when the vehicle is braking and turning. If the offset at the ground is decreased, sensitivity with respect to the steering is decreased, such that the handling stability is increased when the vehicle is cornering and being braked.

Further, stability of the vehicle is closely related to the vibration of the car body. During the vehicle's running, rolling, pitching, and yawing occurs in addition to bounce. These vibrations should be absorbed to increase the stability and ride comfort of the vehicle.

In such vibrations, the rolling occurs at a predetermined point when the vehicle is in a turning situation, and this point is called a roll center. The variation rate of the roll center's height has an effect on the running stability and handling stability of the vehicle. Accordingly, to achieve running stability, it is more desirable to decrease the variation rate of the roll center's height.

FIG. 6A is a schematic diagram of a conventional McPherson type strut, wherein the suspension includes a strut assembly 73 having a shock absorber 72 and a spring 74 and being integrally formed with a knuckle 71, a lower arm 75, and a ball joint 76.

This suspension has an advantage in its simple structure and weight. To reduce the kingpin offset A or attain a negative ($-$) state, an upper supporting point of the strut assembly 73 must be moved to the engine room, or the ball joint portion 76 must be moved to an outside of the engine room. However, in the case where the upper supporting point is moved to the engine room, the available volume of the engine room is to be reduced simultaneously with increasing a kingpin angle $\alpha$ thereby having a bad effect on the cornering performance of the vehicle. Also, it is impossible to move the ball joint portion 76 outside of the engine room because of being interfered with by a disk brake. Therefore, this suspension has a problem in reducing the kingpin offset.

FIG. 6B is a schematic diagram of a conventional Wishbone type suspension system, wherein the suspension includes upper and lower control arms 81 and 82; a steering knuckle 83; a spring assembly 85 having a shock absorber 84; and ball joints 86 and 87 of the upper and lower control arms 81, 82.

Like the McPherson type described above, when connecting point 88 of the upper control arm 81 is moved to the engine room, the available volume of the engine room is reduced when increasing the kingpin offset $\alpha$. The cornering performance of the vehicle may be adversely affected thereby. And also, it is next to impossible to move the ball joint 87 of the lower control arm 82 outside of the engine room because of being interfered with by a disk brake. Therefore, this suspension system also has a problem in reducing the kingpin. Conventional McPherson type and Wishbone type suspension systems have such a small range for the free layout degree of kingpin, that it is impossible to reduce the kingpin offset and there is a limit to improving the function of the suspension system.

Because the up-down movement of a wheel relies on a small arm and the variation rate of the roll center's height is high, the running stability is not good.

SUMMARY OF THE INVENTION

Therefore, the present invention has been made in an effort to solve the above-described problems of the conventional front suspension.

A primary object of the present invention is to provide a front suspension for a vehicle which can make it easy to establish a nominal kingpin and decrease a variation rate of a roll center's height by means of a nominal link.

Another object of the present invention is to provide a front suspension for a vehicle which can increase a free layout degree so as to establish a kingpin independently of variation of camber and tread.

It is a further object of the present invention to maximize the effective volume of an engine room by minimizing the space which a suspension system occupies.

To achieve the above objects, the present invention provides a steerable front wheel suspension for a vehicle comprising: a knuckle for rotatably supporting a wheel for the vehicle, the knuckle having an upper end, a lower end, and a steering arm which is connected by a ball joint to a tie-rod which controls steering; a strut assembly having a shock absorber and a spring assembly; a connecting arm having an upper end which is higher than the wheel and a lower end which is defined by an outer protrusion which is connected to the upper end of the knuckle, and an inner protrusion which is pivotally connected to a lower end of the strut assembly; an upper control arm having two branches respectively pivotally connected to one side of a vehicle body with a rubber bush, and an end pivotally connected to the upper end of the connecting arm; a front lower arm connected to the lower part of the knuckle; a rear lower arm pivotally connected to the side of vehicle body by a rubber bush of a connecting portion; the strut assembly connected at its upper end to the vehicle body by an insulation supporting portion, and pivotally connected at its lower end to the inner protrusion of the connecting arm by a connecting member; a control link having an upper end which is pivotally connected to an inner end of the connecting member of the strut assembly, and a lower end which is pivotally connected to a lower control arm.

The above and further objects, details, and advantages of the present invention will become apparent from the following detailed description of a preferred embodiment thereof, when read in conjunction with the accompanying drawings.

DETAILED DESCRIPTION OF PREFERRED EMBODIMENTS

Figure 1:
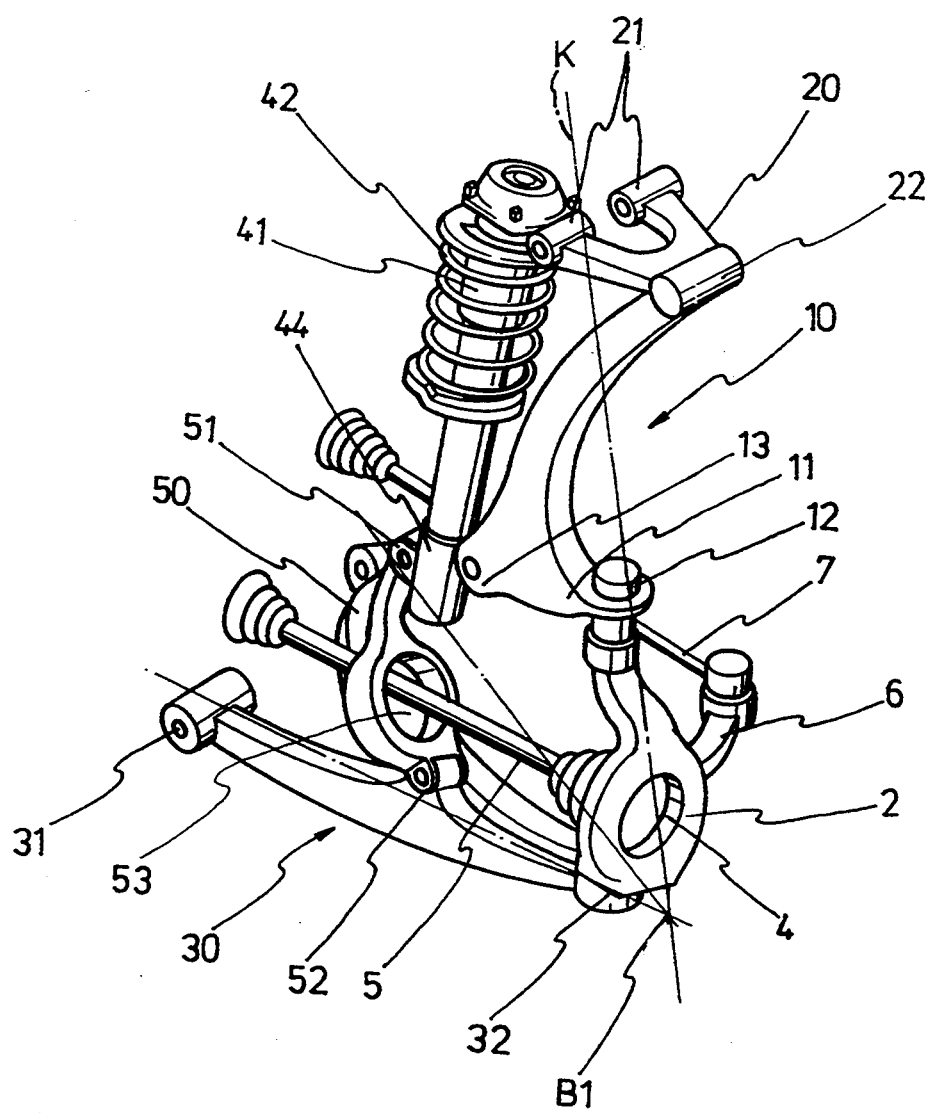
FIG. 1 is a perspective view of a front suspension in accordance with an embodiment of the present invention.
Figure 2:
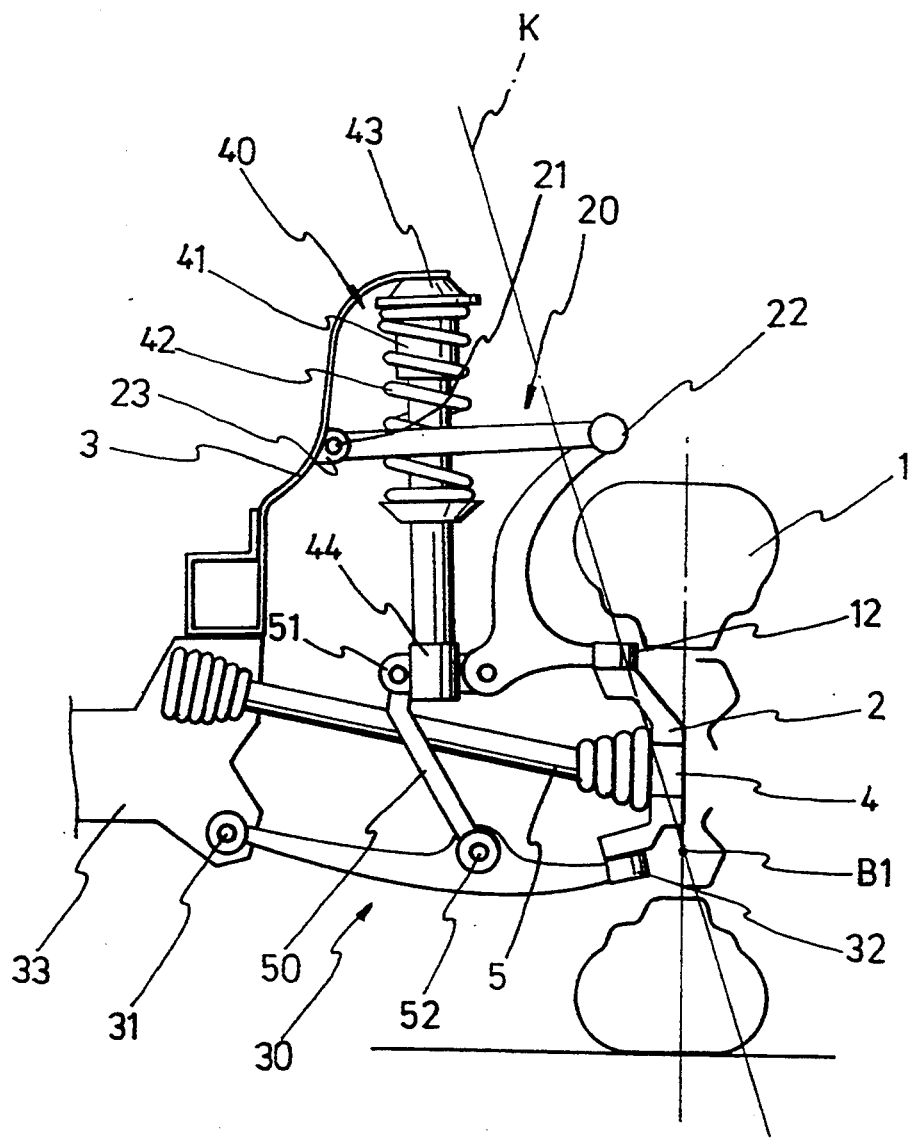
FIG. 2 is a front view of a front suspension in accordance with the embodiment of the present invention.

FIG. 1 and FIG. 2 illustrate one embodiment of the present invention, in which a front suspension comprises a knuckle 2 rotatably supporting a front wheel 1; a connecting arm 10 connected to an upper end of the knuckle 2; upper and lower control arms 20 and 30 connecting an upper end of the connecting arm 10 and a lower end of the knuckle 2 to the vehicle body, thereby enabling the knuckle 2 and the wheel 1 to move up and down with respect to the vehicle body 3; a strut assembly 40 for absorbing impacts or vibrations; and a control link 50 connecting a lower end of the strut assembly 40 to the lower control arm 30.

When the front wheels are driving wheels, the knuckle 2 has a hole 4 through which a driving shaft 5 penetrates and an end of the driving shaft is connected with a spindle (not shown).

A steering arm 6 extends rearward from the steering knuckle 2 and a tie rod 7 is then connected to the steering arm 6 for steering the wheel by a ball joint.

The connecting arm 10 connected to the upper end of the knuckle 2 has an upper end which is higher than the wheel 1 and is curved toward the vehicle body side such that the upper end is disposed inside of a center line of the wheel 1 with a space being of a predetermined width from an upper part of the wheel 1, not to be interfered with by the wheel.

Further, the lower portion of the connecting arm 10 is defined by an inner protrusion 13 pivotally connected to a lower end of the strut assembly 40 and an outer protrusion 11 of connecting portion 12 of which is connected to the upper end of the knuckle 2 by a ball joint.

The upper control arm 20 connecting the upper end of the connecting arm 10 to the vehicle body 3 has two vehicle side connecting portions 21 respectively pivotally connected to a bracket 23 of the vehicle body 3 by a rubber bush, and a wheel side connecting portion 22 pivotally connected to both sides of the upper end of the connecting arm 10 by a rubber bush.

The lower control arm 30 connecting the lower end of the knuckle 2 to a sub-frame 33 of the vehicle body 3 is defined by front and rear arm members. Each of the front and rear lower arm members has a wheel side connecting portion 32 which is commonly connected to the lower end of the knuckle 2 by a ball joint and a vehicle body side connecting portion 31 respectively which is pivotally connected to the sub-frame 33 of the vehicle body 3 by a rubber bush.

The rubber bushes and ball joints for connecting the control arms 20 and 30 respectively to the vehicle body 3 and knuckle 2 are equal to those used for conventional suspension systems, and enable the wheel 1 including the knuckle 2 to move upward and downward with respect to the vehicle body 3.

The rubber bushes for the connecting portions 21, 22, and 31 have proper elasticity, thereby properly controlling the up-down movements of the control arms 20 and 30.

The strut assembly 40 for absorbing the impact and vibration which are transmitted in an up and down direction of the vehicle body is formed with a shock absorber 41 and a spring 42. The strut assembly is connected at its upper end by an insulation supporting portion 43 to the vehicle body 3, and is pivotally connected at its lower end by a connecting member 44 to the inner protrusion 13 of the lower portion of the connecting arm 10, such that it absorbs and lessens the up-down impact.

The control link 50 has an upper connecting portion 51 and a lower connecting portion 52 where an inner end of the connecting member 44 of the strut assembly 40 is pivotally connected to the lower control arm 30 by rubber bushes, and a lower portion of the control link 50 is bent toward the wheel side. The control link 50 has a hole 53 through which the driving shaft 5 penetrates.

The operation effects of the suspension in accordance with the present invention are described with reference to FIGS. 3, 4, and 5. Reference numerals of each connecting portion are given with P for convenience.

When the up-down vibration is transmitted to the wheel or rolling occurs in the vehicle body, instantaneous centers of the upper arm 20 and the lower arm 30 with respect to the vehicle body 3 are respectively junction points P1, P6 where the arms 20 and 30 meet the vehicle body 3 and instantaneous centers of the connecting arm 10 with respect to the upper control arm 20 and the connecting member 44 are junction points P2, P4, respectively. Instantaneous centers of the wheel 1 with respect to the connecting arm 10 and the lower control arm 30 are junction points P5, P8, respectively.

An instantaneous center of the connecting arm 10 with respect to the vehicle body 3 is an intersection point C1 of an extension line of P2, P1 and an extension line of P4, P3, instantaneous center of the wheel 1 with respect to the vehicle body 3 is an intersection point C2 of an extension line of P5, C1, and an extension line of P8, P6.

Figure 3:
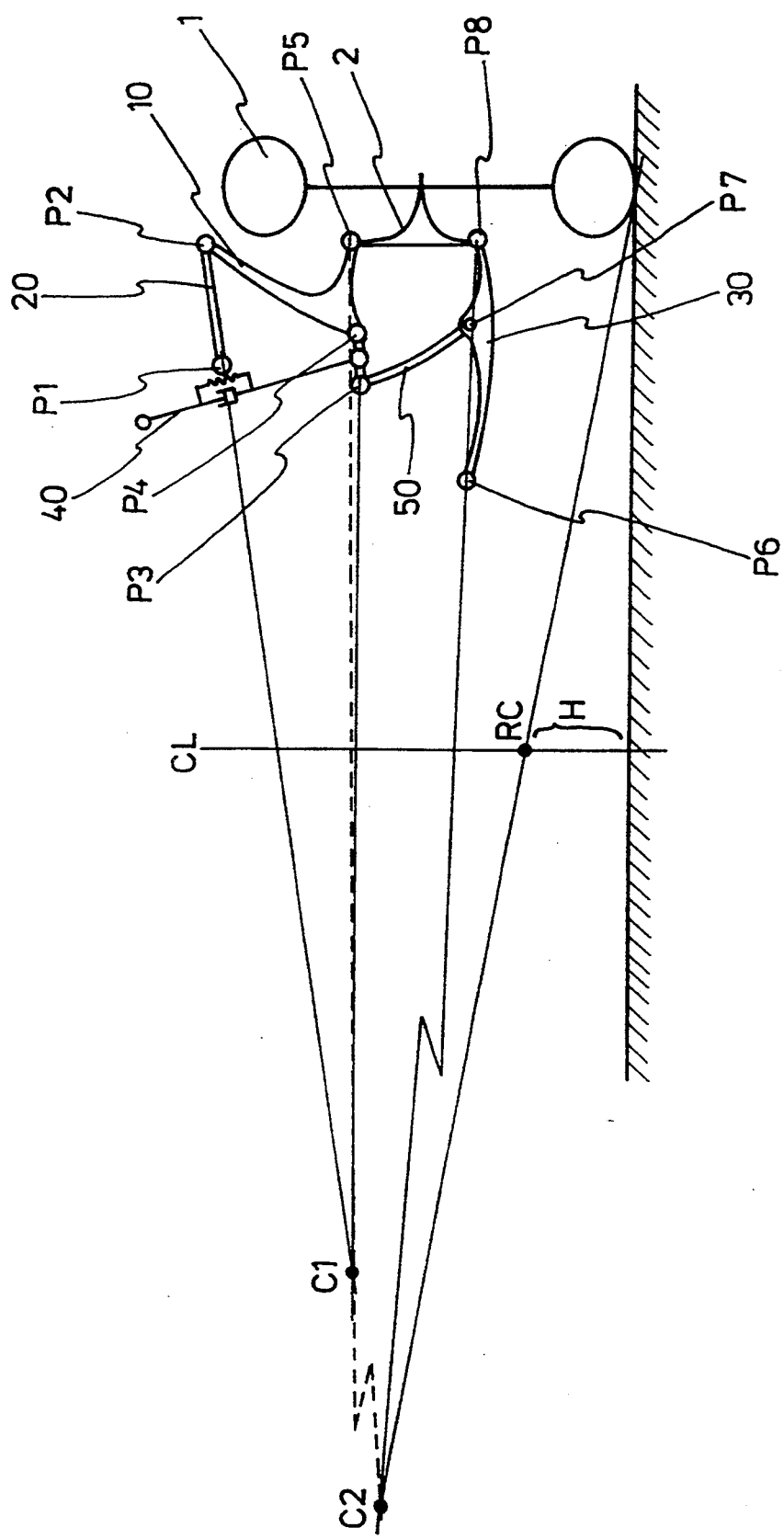
FIGS. 3 and 4 are diagrams showing an operation effect of a front suspension in accordance with the embodiment of the present invention.

Therefore, a dotted line as shown in FIG. 3 connecting the instantaneous center C2 to the junction point P5 becomes a nominal swing arm or a nominal upper control arm.

Figure 4:
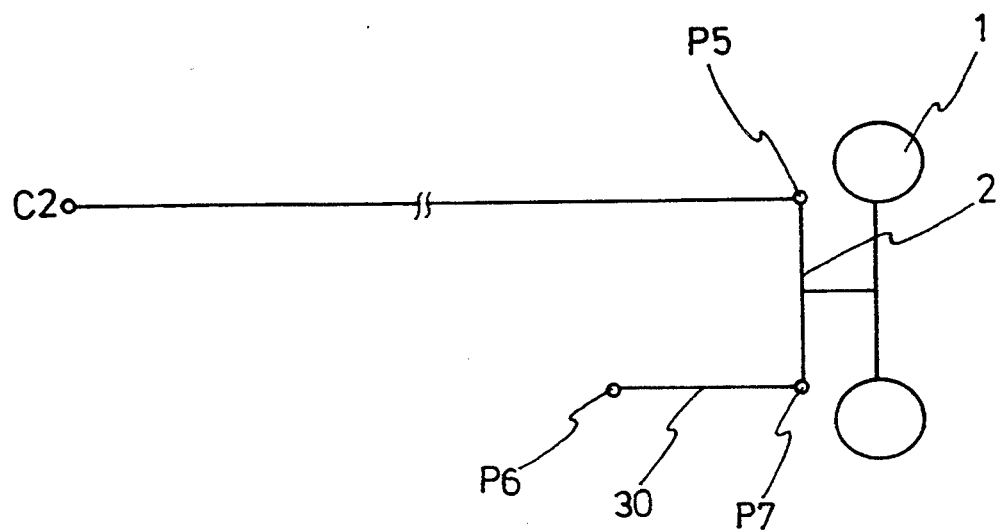

Accordingly, as shown in FIG. 4, the nominal upper control arm is so long that the steering angle of the dotted line with respect to up-down displacement of the instantaneous center C1 is very small.

As a result, the variation of height of the instantaneous center C2 is relatively reduced and a variation of the height H of the roll center RC which is defined by an intersection point of the connecting line connecting the instantaneous center C2 to the ground contact portion of the wheel and the center line CL of the vehicle body is then substantially reduced, and driving stability is enhanced thereby.

Figure 5:
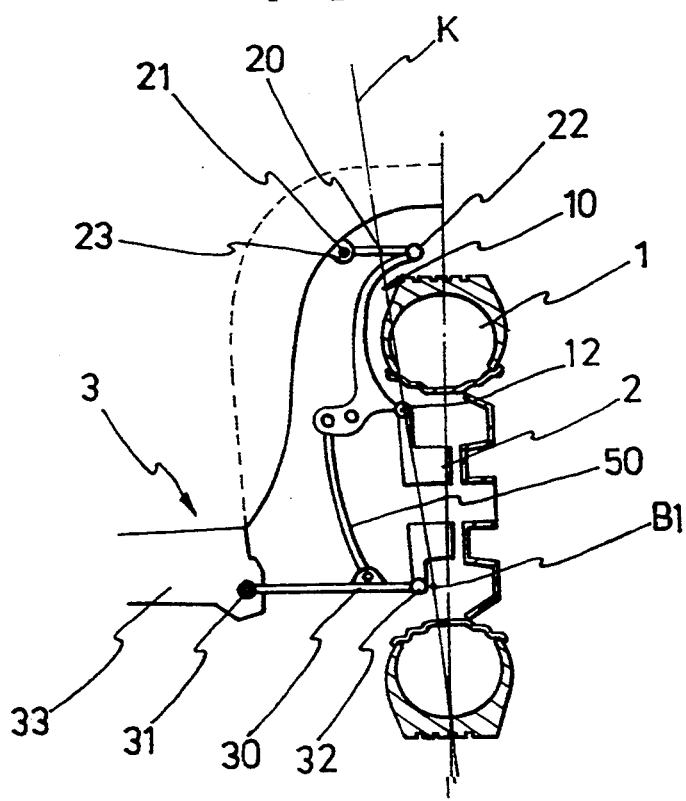
FIG. 5 is a schematic illustration showing an operation effect of a front suspension in accordance with the embodiment of the present invention.
Figure 6A:
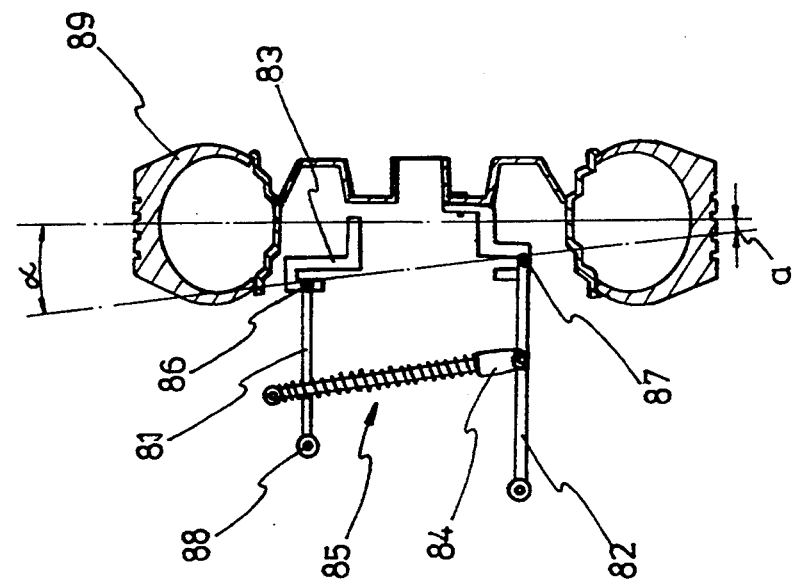
FIGS. 6A and 6B schematically illustrate a front suspension according to a conventional front suspension.
Figure 6B:
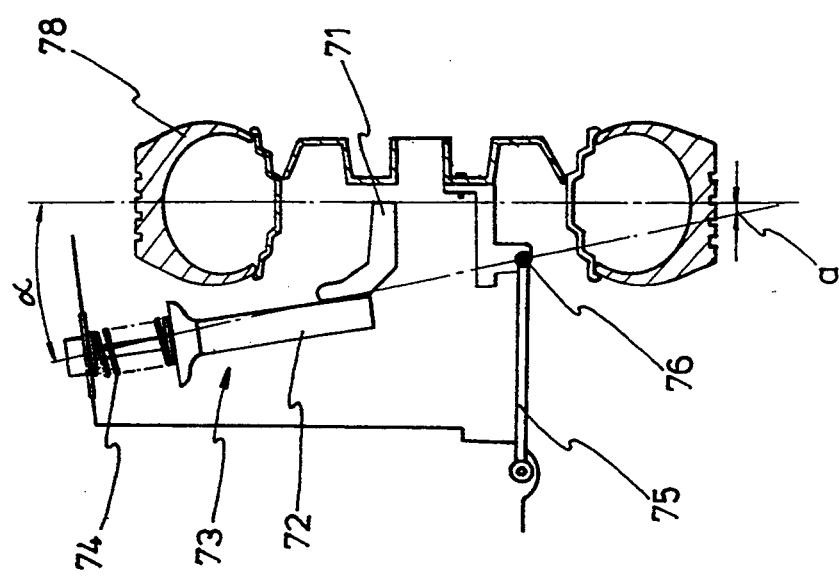

As shown in FIG. 5, the kingpin K is a nominal segment of a line connecting the connecting portion 12 of the outer protrusion 11 of the connecting arm 10 and the upper end of the knuckle 2 to an intersection point B1 of each extension line toward the wheel side of the lower control arms 30 (one of which is not shown), and by varying the degree of curvature of the connecting arm 10 and length of the upper control arm 20, it facilitates adjusting a nominal kingpin K properly.

Accordingly, since the kingpin is easily established, the sensitivity with respect to the steering is reduced so that the driving stability including straight ahead driving stability is improved and establishing a kingpin is independent of variation of a camber and caster angle.

When establishing the kingpin, the wheel side connecting portion 22 of the upper control arm 20 is moved toward the wheel without moving the vehicle side connecting protrusion 21 toward the engine room, thus, as shown in a dotted line in FIG. 5, the effective volume of the engine can be increased.

Although preferred embodiments of the present invention have been described hereinabove, it should be clearly understood that many variations and/or modifications of the basic inventive concepts herein taught which may appear to those skilled in the pertinent art will still fall within the spirit and scope of the present invention, as defined in the appended claims.

What is claimed is:

1. A steerable front wheel suspension for a vehicle comprising:
    a knuckle for rotatably supporting a wheel of the vehicle, said knuckle having an upper end, a lower end, and a steering arm which is connected by a ball joint to a tie-rod which controls steering;
    a strut assembly having a shock absorber and a spring assembly;
    a connecting arm curved toward a vehicle side, having an upper end higher than the wheel and a lower end defined by an outer protrusion connected to the upper end of said knuckle, and an inner protrusion which is pivotally connected to a lower end of said strut assembly;
    an upper control arm having two branches respectively pivotally connected to one side of a vehicle body with a rubber bush, and an end pivotally connected to the upper end of said connecting arm;
    a lower control arm having front and rear lower arm members, one end of each of the front and rear lower arm members being connected to the lower end of said knuckle and an opposing end of each of the front and rear lower arm members, respectively, being pivotally connected to one side of the vehicle body by a rubber bush of a connecting portion;
    said strut assembly connected at its upper end to the vehicle body by an insulation supporting portion, and pivotally connected at its lower end to the inner protrusion of said connecting arm by a connecting member; and
    a control link having an upper end pivotally connected to the connecting member of said strut assembly, and a lower end pivotally connected to the front lower arm member of said lower control arm at a substantially intermediate position thereof.

2. The steerable front wheel suspension according to claim 1, wherein a connecting member of the inner protrusion of the connecting arm is lower than a connecting member of the outer protrusion of the connecting arm.

3. The steerable front wheel suspension according to claim 1, wherein the inner protrusion of the connecting arm is connected to the upper end of the knuckle by a ball joint.

4. The steerable front wheel suspension according to claim 1, wherein a straight line segment connecting a point of intersection of the connecting arm and the upper end of the knuckle to a point of intersection of an extension line of each front and rear lower arm members of said lower control arm toward the wheel side of said lower control arm is a nominal kingpin.

5. The steerable front wheel suspension according to claim 1, wherein the upper end of the control link inclines toward the vehicle body.

6. A steerable front wheel suspension comprising:
    a knuckle;
    an upper control arm;
    a lower control arm connecting said knuckle to a vehicle body;
    a strut assembly;
    a connecting arm;
    a control link; and
    a connecting member connecting said connecting arm and said control link fixed to said strut assembly,
    wherein plural links are connected so that an instantaneous center of the wheel with respect to the vehicle body is defined by an intersection point of a first nominal line formed by connecting an intersection point of a nominal line connecting hinge points of both ends of said upper control arm and a nominal line connecting hinge points of said connecting member to an instantaneous center of a wheel with respect to said connecting arm, and a second nominal line formed by connecting hinge points of both ends of said lower control arm, and wherein a roll center is formed at a point of intersection of a nominal straight line segment connecting the instantaneous center of the wheel with respect to the vehicle to a center line of the vehicle body.

7. The steerable front wheel suspension according to claim 6, wherein a straight line segment connecting the instantaneous center of the wheel with respect to the vehicle to a point of intersection of the connecting arm and the knuckle is a nominal swing arm.

* * * * *